(12) United States Patent
Choi et al.

(10) Patent No.: US 7,064,968 B2
(45) Date of Patent: Jun. 20, 2006

(54) CONTROL FOR A SWITCHING POWER SUPPLY HAVING AUTOMATIC BURST MODE OPERATION

(75) Inventors: Jin-ho Choi, Seoul (KR); Dong-young Huh, Kyungki-do (KR)

(73) Assignee: Fairchild Korea Semiconductor Ltd., Kyungki-Do (KR)

( * ) Notice: Subject to any disclaimer, the term of this patent is extended or adjusted under 35 U.S.C. 154(b) by 156 days.

(21) Appl. No.: 10/724,858

(22) Filed: Dec. 1, 2003

(65) Prior Publication Data

US 2004/0120171 A1    Jun. 24, 2004

(30) Foreign Application Priority Data

Dec. 18, 2002  (KR) ............................... 2002-81391
Oct. 14, 2003  (KR) ............................... 2003-71424

(51) Int. Cl.
*H02M 7/537* (2006.01)
(52) U.S. Cl. ..................................... 363/97; 363/21.12
(58) Field of Classification Search ............. 363/21.01, 363/21.12, 95, 97
See application file for complete search history.

(56) References Cited

U.S. PATENT DOCUMENTS

| | | | |
|---|---|---|---|
| 5,272,614 A | 12/1993 | Brunk | 363/21 |
| 5,325,282 A | 6/1994 | Bansard | 363/21 |
| 5,349,523 A | 9/1994 | Inou et al. | 363/97 |
| 5,932,938 A | 8/1999 | Shimamori | 307/125 |
| 6,169,680 B1 | 1/2001 | Matsui et al. | 363/97 |
| 6,252,783 B1 * | 6/2001 | Huh et al. | 363/21.01 |
| 6,275,018 B1 | 8/2001 | Telefus et al. | 323/282 |
| 6,304,462 B1 * | 10/2001 | Balakrishnan et al. | 363/21.01 |
| 6,304,473 B1 | 10/2001 | Telefus et al. | 363/97 |
| 6,324,079 B1 | 11/2001 | Collmeyer et al. | 363/21.15 |
| 6,445,598 B1 * | 9/2002 | Yamada | 363/21.12 |
| 6,515,876 B1 * | 2/2003 | Koike et al. | 363/21.16 |
| 6,519,165 B1 * | 2/2003 | Koike | 363/21.12 |
| 6,646,894 B1 * | 11/2003 | Hong et al. | 363/21.01 |
| 6,839,247 B1 * | 1/2005 | Yang et al. | 363/21.11 |
| 6,842,350 B1 * | 1/2005 | Yamada et al. | 363/21.16 |

* cited by examiner

Primary Examiner—Jeffrey Sterrett
(74) Attorney, Agent, or Firm—Sidley Austin LLP

(57) ABSTRACT

Provided is a control module circuit for use with a switching power supply (SPS). The control module circuit has normal and standby operation modes controls switch-on/off operations of a switching device by using a feedback voltage that is inversely proportional to an output voltage. The control module circuit includes a voltage set-up unit and a switching control signal generating unit. The voltage set-up unit provides a first voltage used for a switch-on operation of the switching device in response to changes in the feedback voltage and a second voltage used for a switch-off operation of the switching device in response to changes in the feedback voltage, in the standby operation mode. The switching control signal generating unit generates a control signal used to turn on the switching device when the first voltage is provided from the voltage set-up unit and a control signal used to turn off the switching device when the second voltage is provided from the voltage set-up unit.

14 Claims, 9 Drawing Sheets

CONTROL FOR A SWITCHING POWER SUPPLY HAVING AUTOMATIC BURST MODE OPERATION

CROSS REFERENCE TO RELATED APPLICATION

This application claims the priority of Korean Patent Application Nos. 02-81391 and 03-71424, filed on 18 Dec. 2002 and 14 Oct. 2003, respectively, in the Korean Intellectual Property Office, the disclosures of which are hereby incorporated by reference in their entireties.

BACKGROUND OF THE INVENTION

1. Field of the Invention

The present invention relates to a switching power supply (SPS), and more particularly, to control for a switching power supply (SPS) having an automatic burst mode operation.

2. Description of the Related Art

In general, a switching power supply (SPS) is a device for converting a direct current (DC) supply voltage into one or more DC output voltages that have a greater or lesser magnitude than the DC supply voltage. Such SPSs have been widely used with power electronic devices, particularly battery-powered devices, such as portable cellular phones and laptop computers. Typically, these SPSs have a normal operation mode and a standby operation mode. In the normal operation mode, the power electronic devices consume a relatively large amount of power. In the standby operation mode, by contrast, the power electronic devices consume a relatively small amount of power. These power electronic devices may automatically enter the standby operation mode if a user has not used them for a predetermined amount of time and may automatically enter the normal operation mode if the user begins to use them again.

In most electronic devices, power consumption in the standby operation mode is much smaller than that in the normal operation mode. To reduce power consumption in the standby operation mode, the control of input power in the standby operation mode has been gradually tightened. Conventionally, to meet such control requirements, an output voltage of the SPS is reduced or an additional power source is used to reduce power consumption in the standby operation mode. However, such approaches for entering the standby operation mode are not desirable because they require additional components, thereby resulting in high production costs. Moreover, because there is an output voltage below the level needed for functioning of the electronic devices, the extent to which power consumption of the electronic devices can be decreased is limited. Also, when using a conventional SPS in the standby operation mode, a substantial switching loss occurs in the conventional SPS despite the reduction in power consumption due to a reduced output voltage. In addition, the conventional SPS changes a duty cycle of a power switch in order to compensate for changes in power requirements at its output end and operate at a predetermined frequency irrespective of the amount of power supplied. As a result, the power switch within the conventional SPS operating in the standby operation mode performs switch-on/off operations at the same rate as when the SPS is operating in the normal operation mode. In the standby operation mode, such switching operations consume a considerable amount of power, which increases the lower limit of power consumption in the standby operation mode.

In an attempt to solve such problems, a switching power supply (SPS) has been proposed which uses active circuitry to provide the normal operation mode and a low power burst mode that enables a standby operation of an electronic device. U.S. Pat. No. 6,252,783 discloses the operation and configuration of such an SPS. In the normal operation mode, the active circuitry couples an output voltage of the SPS to a conventional switch driver circuit (or a control module circuit). This switch driver circuit changes a duty cycle of an output having a fixed frequency of a switch driver in order to regulate the output voltage of the SPS to a desired level. When the electronic device is operating in the low power burst mode, the active circuitry separates the output voltage of the SPS from the switch driver circuit and applies a periodic signal to the switch driver. This periodic signal causes the switch driver to provide the output having the fixed frequency for certain time intervals. These time intervals are interleaved with time intervals during which the output of the switch driver is inactive—i.e., the switch driver turns the switch off. In addition, when the electronic device is operating in the low power burst mode, the active circuitry applies an input signal to the switch driver. This signal causes the switch driver to repeatedly turn the switch on and off at a fixed frequency—i.e., at a minimum duty cycle. The low power burst mode during which the switch driver provides the output having the fixed frequency is appropriately controlled so that a supply voltage to the switch driver changes between two reference voltages.

Such SPS having the low power burst mode reduces the switching loss by performing and stopping switch-on/off operations for a predetermined amount of time in the standby operation mode. This reduces power consumption. In addition, the SPS can maintain an output voltage in the standby operation mode at a lower level than in the normal operation mode and can control the switch-on/off operations of the switch in the standby operation mode by using the low power burst mode at a predetermined time interval irrespective of the output voltage of the SPS.

However, such SPS having the low power burst mode may have audible noises as the maximum amplitude of current increases. As the maximum amplitude of current increases, so does the importance of the switching loss. The SPS may have conduction loss and core loss as well as switching loss. When a light load is used by the entire system, the switching loss increases relatively. Thus, when using the light load, frequent audible noises are caused and more power is consumed with the increase in the maximum amplitude of current.

SUMMARY OF THE INVENTION

In one embodiment, the present invention provides a control module for use with a switching power supply (SPS) having an automatic burst mode operation. The use of the control module limits or maintains the maximum amplitude of current to below a predetermined value irrespective of changes in an output voltage of the SPS, and conversion from a burst operation mode to a normal operation mode can be easily performed.

According to an embodiment of the present invention, a control module of a switching power supply (SPS) having normal and standby operation modes is provided. The control module controls switch-on/off operations of a switching device of the SPS using a feedback voltage that is inversely proportional to an output voltage. The control module includes a voltage set-up unit operable to provide a first voltage used for a switch-on operation of the switching device in response to changes in the feedback voltage and a second voltage used for a switch-off operation of the switching device in response to changes in the feedback voltage, in the standby operation mode. A switching control unit, coupled to the voltage set-up unit, is operable to generate a control signal. The control signal is used to turn on the switching device when the first voltage is provided from the voltage set-up unit and is used to turn off the switching device when the second voltage is provided from the voltage set-up unit.

According to another embodiment of the present invention, a control module of a switching power supply (SPS) having normal and standby operation modes is provided. The control module controls switch-on/off operations of a switching device using a feedback voltage that is inversely proportional to an output voltage. The control module includes a first voltage supply means operable to supply a first voltage that is proportional to the feedback voltage, in response to a first control signal. A second voltage supply means is operable to supply a second voltage of a predetermined magnitude, in response to a second control signal. A control signal generating means is operable to generate the first control signal or the second control signal according to an amount of the feedback voltage. A selector is operable to receive and to output the first voltage or the second voltage. A switching control signal generating means is operable to generate a switching control signal for the switching device in response to an output signal from the selector.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Figure 1:
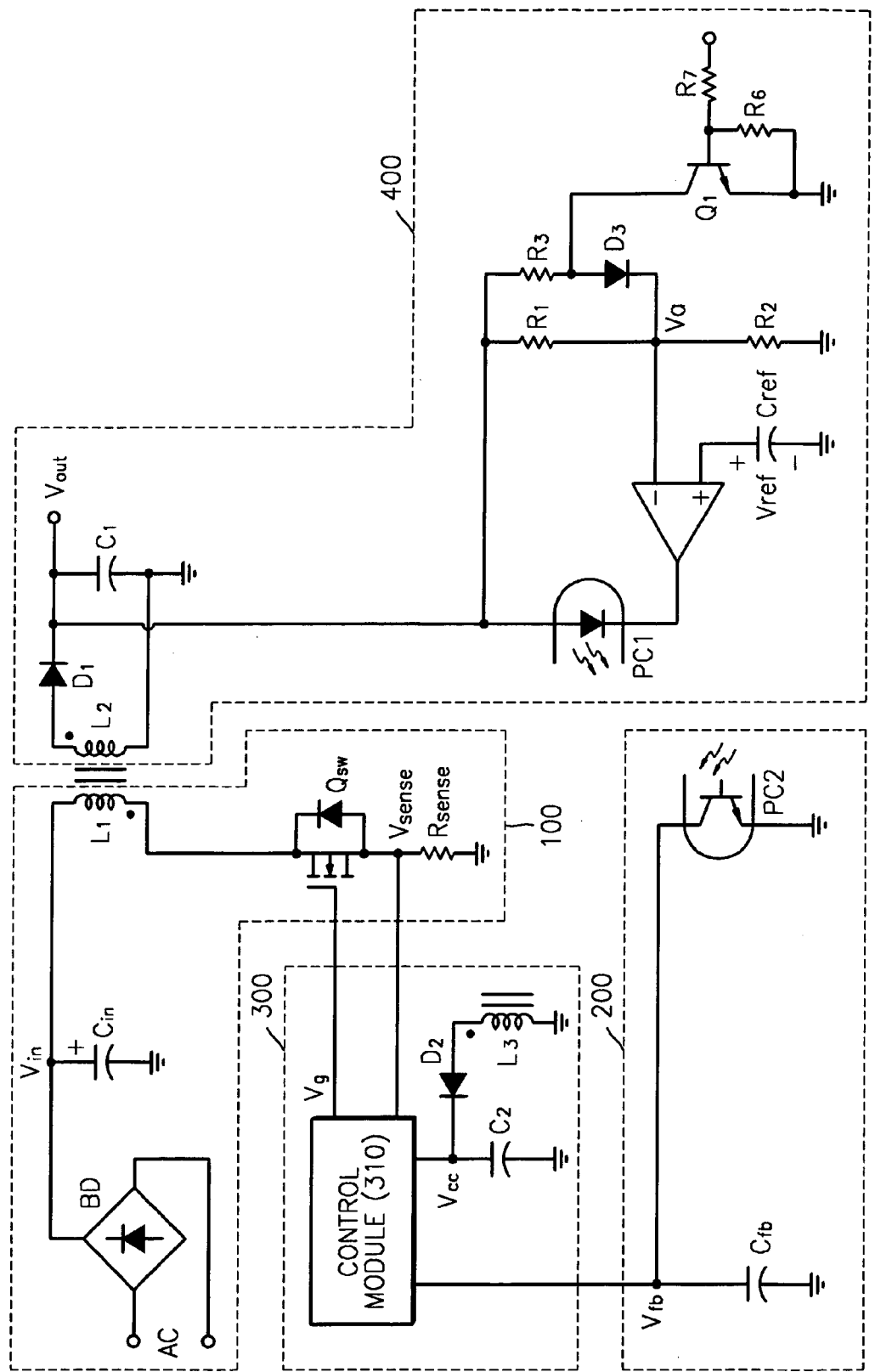
FIG. 1 is a circuit diagram of a switching power supply (SPS) according to an embodiment of the present invention.

The present invention will now be described more fully with reference to the accompanying drawings, in which preferred embodiments of the invention are shown. In the drawings, the forms of elements may be exaggerated for clarity. To facilitate understanding, identical reference numerals have been used, where possible, to designate identical elements that are common among the figures.

FIG. 1 is a circuit diagram of a switching power supply (SPS) 10 according to an embodiment of the present invention. The SPS 10 can operate in a burst mode. SPS 10 may be incorporated in or used by an electronic device. As depicted in FIG. 1, the SPS 10 includes a power supply unit 100 for power supply, a feedback circuit unit 200 for feedback of an output voltage, a switching control unit 300 for control of switch-on/off operations in the power supply unit 100, and a mode set-up unit 400 for set-up of an operation mode.

The power supply unit 100 includes a bridge diode circuit BD 102, a primary coil $L_1$ 104, a filter capacitor $C_{in}$ 106 a transistor $Q_{sw}$ 108 and a current sense resistor $R_{sense}$ 110. The bridge diode circuit BD 102 operates as a full wave rectifier and outputs a direct current output power which can be used for a supply voltage $V_{in}$. The primary coil $L_1$ 104 is connected to the supply voltage $V_{in}$ and the transistor $Q_{sw}$ 108, which can be a MOS field effect transistor. The filter capacitor $C_{in}$ 106 filters current pulses provided by the bridge diode circuit BD 102 to generate the supply voltage $V_{in}$ as a substantially direct current voltage. The transistor $Q_{sw}$ 108 is used as a power switch and performs switch-on/off operations under the control of a control module 310 in control unit 300. The current sense resistor $R_{sense}$ 110 is used to provide a current feedback to the control module 310. In particular, the current sense resistor $R_{sense}$ 110 develops a sense voltage $V_{sense}$ which is indicative of the amount of current flowing between a drain and a source of the transistor $Q_{sw}$ 108.

The feedback circuit unit 200 may include a phototransistor $PC_2$ 202 and a capacitor $C_{fb}$ 204. The phototransistor $PC_2$ 202 and a photodiode $PC_1$ 424 of the mode set-up unit 400 may implement a photocoupler. The phototransistor $PC_2$ 202 generates a current of a predetermined amplitude, based on an amplitude of current flowing through the photodiode $PC_1$ 424. The capacitor $C_{fb}$ 204, which may have a predetermined amount of charge that varies with the predetermined amplitude of current generated by the phototransistor $PC_2$, 202 changes a feedback voltage $V_{fb}$ based on the predetermined amount of charge. In other words, the feedback voltage $V_{fb}$ changes with a voltage of an operation mode set by the mode set-up unit 400. The feedback voltage $V_{fb}$ is input to the switching control unit 300.

The switching control unit 300 includes the control module 310, a capacitor $C_2$ 312, a diode $D_2$ 314, and a secondary coil $L_3$ 316. The control module 310 receives the feedback voltage $V_{fb}$, the sense voltage $V_{sense}$ indicative of the amount of current flowing between a drain and source of the transistor $Q_{sw}$ 108, and a charge voltage $V_{cc}$ of the capacitor $C_2$ 312. In response to the received voltages or signals, the control module 310 generates a switching control signal $V_g$ to control switch-on/off operations of the transistor $Q_{sw}$ 108. The secondary coil $L_3$ 316 is provided with energy by switch-on/off operations of the transistor $Q_{sw}$ 108 and generates current pulses. The diode $D_2$ 314 rectifies the current pulses generated by the secondary coil $L_3$ 316, and the capacitor $C_2$ 312 smoothes the rectified current pulses, such that the charge voltage $V_{cc}$ is provided to the control module 310 as a substantially direct current supply voltage.

In one embodiment, the control module 310 may comprise a voltage set-up unit and a switching control unit. The voltage set-up unit can generate or provide one or more voltage signals. A first voltage signal may be used for a switch-on operation of the switching device or transistor $Q_{sw}$ 108, for example, in response to changes in the feedback voltage $V_{fb}$ or other signals. A second voltage signal may be used for a switch-off operation of the transistor $Q_{sw}$ 108, for example, in response to changes in the feedback voltage $V_{fb}$ or other signals, in the standby operation mode. The switching control unit may generate a control signal for turning on and off the switching device or transistor $Q_{sw}$ 108. In particular, the control signal is used to turn on the switching device or transistor $Q_{sw}$ 108 when the first voltage signal is provided by the voltage set-up unit, and the control signal is used to turn off the transistor $Q_{sw}$ 108 when the second voltage is provided from the voltage set-up unit. Exemplary implementations for the voltage set-up unit and a switching control unit are described herein. In some embodiments, the control module 310 can be implemented in hardware, software, or a combination thereof.

As shown, the mode set-up unit 400 may include a plurality of resistors $R_1$ 402, $R_2$ 404, $R_3$ 406, $R_6$ 408, and $R_7$ 410, diodes $D_1$ 412 and $D_3$ 414, capacitors $C_1$ 416 and $C_{ref}$ 418, a transistor $Q_1$ 420, an error amplifier $Amp_1$ 422, and the photodiode $PC_1$ 424. The resistors $R_6$ 408 and $R_7$ 410, the diode $D_3$ 414, and the transistor $Q_1$ 420 are used to perform the switch-on/off operations. In particular, the resistors $R_6$ 408 and $R_7$ 410 are used to provide a proper bias to the transistor $Q_1$. The resistors $R_1$ 402 $R_2$ 404 and $R_3$ 406 are used to determine a mode control voltage $V_a$. Based on whether the operation mode is a normal operation mode or a standby operation mode, the mode control voltage $V_a$ may be determined by Equations 1 or 2 below, $$V_a = V_{out} \times \frac{R_2}{R_1 + R_2} \text{ (in the normal operation mode)} \quad (1)$$

$$V_a = V_{out} \times \frac{R_2}{R_1 \text{ // } R_3 + R_2} \text{ (in the standby operation mode)} \quad (2)$$

wherein $R_1 \text{ // } R_3$ represents $\frac{R_1 R_3}{R_1 + R_3}$.

An operational amplifier 422 functioning as the error amplifier $Amp_1$ has an inverting input (−) and a non-inverting input (+). The mode control voltage $V_a$ is applied to the inverting input (−), and a reference voltage $V_{ref}$ is applied to the non-inverting input (+). An output of the operational amplifier is connected to an anode of the photodiode $PC_1$ 424. The operational amplifier determines whether the photodiode $PC_1$ 424 operates by comparing the mode control voltage $V_a$ with the reference voltage $V_{ref}$. As described herein, the photodiode $PC_1$ 424 and the phototransistor $PC_2$ 202 of the feedback circuit unit 200 implement the photocoupler. The photodiode $PC_1$ 424 operates or does not operate based on the compared result of the mode control voltage $V_a$ and the reference voltage $V_{ref}$.

The SPS 10 having the configuration described above operates as follows.

In the normal operation mode, the supply voltage $V_{in}$ (generated as a direct current output power by full wave rectification of the alternating current input power AC by the bridge diode circuit BD 102) is provided to the primary coil $L_1$ 104. The supply voltage $V_{in}$ provided to the primary coil $L_1$ 104 causes an output voltage $V_{out}$ to be generated in the secondary coil $L_2$ at a duty cycle defined by the switch-on/off operations of the transistor $Q_{sw}$ 108. The duty cycle is determined based on a gate driving signal $V_g$ output from the control module 310 for control of the transistor $Q_{sw}$ 108. The magnitude of the output voltage $V_{out}$ generated in the secondary coil $L_2$ is large enough to enable the normal operation of an electronic device using the SPS 10.

To maintain the output voltage $V_{out}$ at a specific level, it is necessary to control the duty cycle at which the transistor $Q_{sw}$ 108 performs the switch-on/off operations. The output voltage $V_{out}$ is fed back for control of the duty cycle. More specifically, a high signal indicating the normal operation mode is applied to a base of the transistor $Q_1$ and turns on the transistor $Q_1$ in the mode set-up unit 400. Once the transistor $Q_1$ is turned on, a reverse bias is applied to the diode $D_3$. This turns off the diode $D_3$, and thus the mode control voltage $V_a$ applied to the inverting input (−) of the error amplifier $Amp_1$ 422 is determined per Equation 1 above. The operational amplifier 422 amplifies the mode control voltage $V_a$ to a predetermined level and outputs the result to the photodiode $PC_1$ 424. Because of the photocoupler arrangement of the photodiode $PC_1$ 424 with the phototransistor $PC_2$ 202, the amplitude of current flowing through the phototransistor $PC_2$ 202 is determined based on the input to the photodiode $PC_1$ 424 (i.e., the output from the operational amplifier 422). This current charges the feedback capacitor $C_{fb}$ 204, and the feedback voltage $V_{fb}$ is determined based on the amount of charge in the feedback capacitor $C_{fb}$ 204. As a result, the feedback voltage $V_{fb}$ is inversely proportional to the magnitude of the mode control voltage $V_a$. The feedback voltage $V_{fb}$ is input to the control module 310.

The charge voltage $V_{cc}$ of the capacitor $C_2$ 312 also is input to the control module 310. The supply voltage $V_{in}$ applied to the primary coil $L_1$ 104 in the normal operation mode causes a coil voltage to be generated in the secondary coil $L_3$ 316. Thus, the charge voltage $V_{cc}$ of the capacitor $C_2$ 312 is applied to the control module 310. A sense voltage $V_{sense}$ used to sense the amount of current flowing between the drain and source of the transistor $Q_{sw}$ 108 also is input to the control module 310. The control module 310 (receiving the feedback voltage $V_{fb}$, the charge voltage $V_{cc}$ of the capacitor $C_2$ 312, and the sense voltage $V_{sense}$) outputs a gate voltage $V_g$ to the gate node of the transistor $Q_{sw}$ 108, thereby controlling the switch-on/off operations of the transistor $Q_{sw}$ 108 to maintain the normal operation mode.

In the standby operation mode, the supply voltage $V_{in}$ that is generated by full wave rectification of the alternating current input power AC by the bridge diode circuit BD 102 is provided to the primary coil $L_1$ 104. The supply voltage $V_{in}$ provided to the primary coil $L_1$ 104 causes an output voltage $V_{out}$ to be generated in the secondary coil $L_2$ at a duty cycle through the switch-on/off operations of the transistor $Q_{sw}$ 108. The duty cycle is determined based on the gate driving signal output from the control module 310 for control of the transistor $Q_{sw}$ 108. The magnitude of the output voltage $V_{out}$ generated in the secondary coil $L_2$ is large enough to enable the standby operation of the electronic device using the SPS 10 and is smaller than the output voltage $V_{out}$ in the normal operation mode.

To maintain the output voltage $V_{out}$ at a specific level, it is necessary to control the duty cycle at which the transistor $Q_{sw}$ 108 performs the switch-on/off operations. For control of the duty cycle, the output voltage $V_{out}$ can be fed back to switching control unit 300. More specifically, a low signal indicating the standby operation mode is applied to the base of the transistor $Q_1$ of mode set-up unit 400. This turns off the transistor $Q_1$. Once the transistor $Q_1$ is turned off, a forward bias is applied to the diode $D_3$ in mode set-up unit 400. This turns off the diode $D_3$, and thus the mode control voltage $V_a$ applied to the inverting input (−) of the operational amplifier 422 is determined per Equation 2 above. When comparing Equations 1 and 2, it can be seen that the mode control voltage $V_a$ of Equation 2 (in the standby operation mode) is greater than that of Equation 1 (in the normal operation mode). The operational amplifier 422 amplifies the mode control voltage $V_a$ to a level higher than in the normal operation mode and inputs the amplified mode control voltage $V_a$ to the photodiode $PC_1$ 424. Because of the photocoupler arrangement of the photodiode $PC_1$ 424 with the phototransistor $PC_2$ 202, the amplitude of current flowing through the phototransistor $PC_2$ 202 is determined based on the input to the photodiode $PC_1$ 424 (i.e., the output from the operational amplifier 422). The feedback capacitor $C_{fb}$ 204 is charged with such a current, and the feedback voltage $V_{fb}$ is determined based on the amount of charge in the feedback capacitor $C_{fb}$ 204. As a result, the feedback voltage $V_{fb}$ is inversely proportional to the magnitude of the mode control voltage $V_a$. Since the mode control voltage $V_a$ in the standby operation mode is greater than that in the normal operation mode, the feedback voltage $V_{fb}$ in the standby operation mode is smaller than that in the normal operation mode (e.g., substantially near 0V) and is input to the control module 310.

The charge voltage $V_{cc}$ of the capacitor $C_2$ 312 is also input to the control module 310. The supply voltage $V_{in}$ provided to the primary coil $L_1$ 104 in the standby operation mode causes a voltage to be generated in the secondary coil $L_3$ 316 of the switching control unit 300. Thus, the charge voltage $V_{cc}$ of the capacitor $C_2$ 312 is applied to the control module 310. The sense voltage $V_{sense}$ (used to sense the amount of current flowing between the drain and source of the transistor $Q_{sw}$ 108) is also input to the control module 310. In response to the feedback voltage $V_{fb}$, the charge voltage $V_{cc}$ of the capacitor $C_2$ 312, and the sense voltage $V_{sense}$, the control module 310 outputs the gate voltage $V_g$ to the gate node of the transistor $Q_{sw}$ 108, thereby controlling the switch-on/off operations of the transistor $Q_{sw}$ 108 to maintain the standby operation mode.

Figure 2:
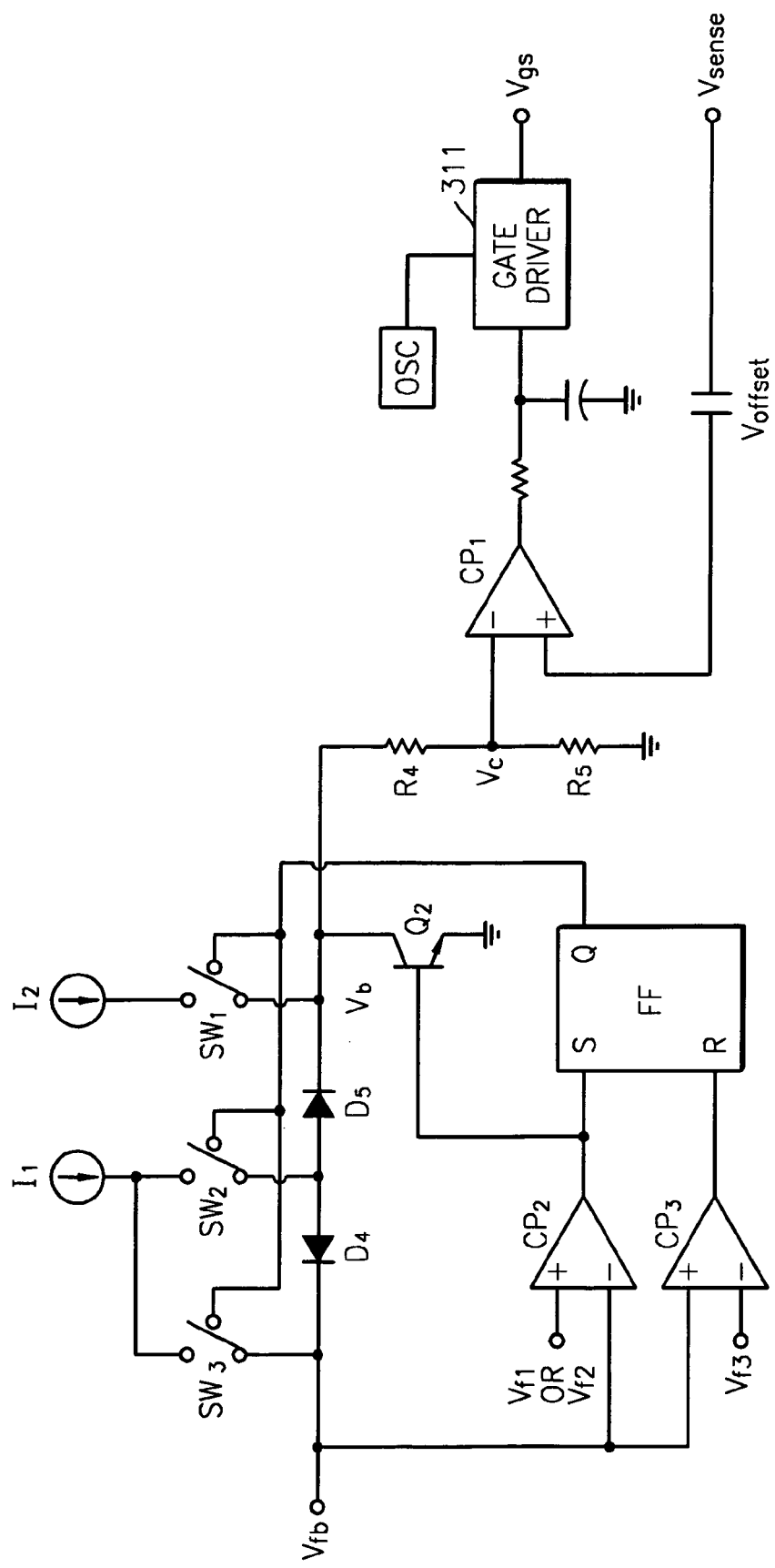
FIG. 2 is a circuit diagram of an implementation for a control module according to an embodiment of the present invention.

FIG. 2 is a circuit diagram of an implementation for a control module 310 according to an embodiment of the present invention.

As depicted in FIG. 2, the control module 310 may include a comparator $CP_2$ 320 and a comparator $CP_3$ 322, both of which can be implemented as operational amplifiers. The operational amplifier of the comparator $CP_2$ 320 receives the feedback voltage $V_{fb}$ through its inverting input (−) and a first or second feedback reference voltage $V_{f1}$ or $V_{f2}$ (which can be smaller than the feedback voltage $V_{fb}$) through its non-inverting input (+). The operational amplifier of the comparator $CP_3$ 322 receives the feedback voltage $V_{fb}$ through its non-inverting input (+) and a third feedback reference voltage $V_{f3}$ (which can be smaller than the feedback voltage $V_{fb}$) through its inverting input (−).

The output signals of the comparators $CP_2$ 320 and $CP_3$ 322 are input to an S input and an R input of an RS flip-flop FF 324, respectively. The output of the comparator $CP_2$ 320 is also input to a base of the transistor $Q_2$ 326. An emitter of the transistor $Q_2$ 326 is grounded, and a collector of the transistor $Q_2$ 326 is connected to resistors $R_4$ 346 and $R_5$ 348. Resistors $R_4$ 346 and $R_5$ 348 are serially connected with each other and to an input end of the feedback voltage $V_{fb}$ through diodes $D_4$ 332 and $D_5$ 334. The diodes $D_4$ 332 and $D_5$ 334 are arranged in opposite directions. In other words, a cathode of the diode $D_4$ 332 faces the input end of the feedback voltage $V_{fb}$, and an anode of the diode $D_4$ 332 faces the collector of the transistor $Q_2$ 326. A cathode of the diode $D_5$ 334 faces the collector of the transistor $Q_2$ 326, and an anode of the diode $D_5$ 334 faces the input end of the feedback voltage $V_{fb}$. Therefore, the anodes of the diodes $D_4$ 332 and $D_5$ 334 are interconnected.

A first switch $SW_1$ 336 may selectively connect a node between the cathode of the diode $D_5$ 334 and the collector of the transistor $Q_2$ 326 with either a second static current source $I_2$ 342 or the Q output of the RS flip-flop FF 324. A second switch $SW_2$ may selectively connect a node between the anode of the diode $D_4$ 332 and the anode of the diode $D_5$ 334 with either a first current source $I_1$ 344 or the Q output of the RS flip-flop FF 324. A third switch $SW_3$ may selectively connect a node between the input end of the feedback voltage $V_{fb}$ and the cathode of the diode $D_4$ 332 with either the first current source $I_1$ 344 or the Q output of the RS flip-flop FF 324.

A voltage $V_C$ at a connection point between the resistors $R_4$ 346 and $R_5$ 348 is input to the inverting input (−) of the operational amplifier of a comparator $CP_1$ 350. The non-inverting input (+) of the operational amplifier of the comparator $CP_1$ 350 is input to the sense voltage $V_{sense}$ through an offset direct current source $V_{offset}$. The sense voltage is developed based on the amount of current flowing through the transistor $Q_{sw}$ 108 and the resistance of the current sense resistor $R_{sense}$ 110. The output of the comparator $CP_1$ 350 is input to a gate driver 311. The gate driver 311 also receives an output of an oscillator OSC 352 and outputs the gate voltage $V_g$. The switch-on/off operations of the transistor $Q_{sw}$ 108 are controlled by using the gate voltage $V_g$, and the duty cycle at which the switch-on/off operations are performed is determined by a signal output from the oscillator OSC 352.

Figure 3:
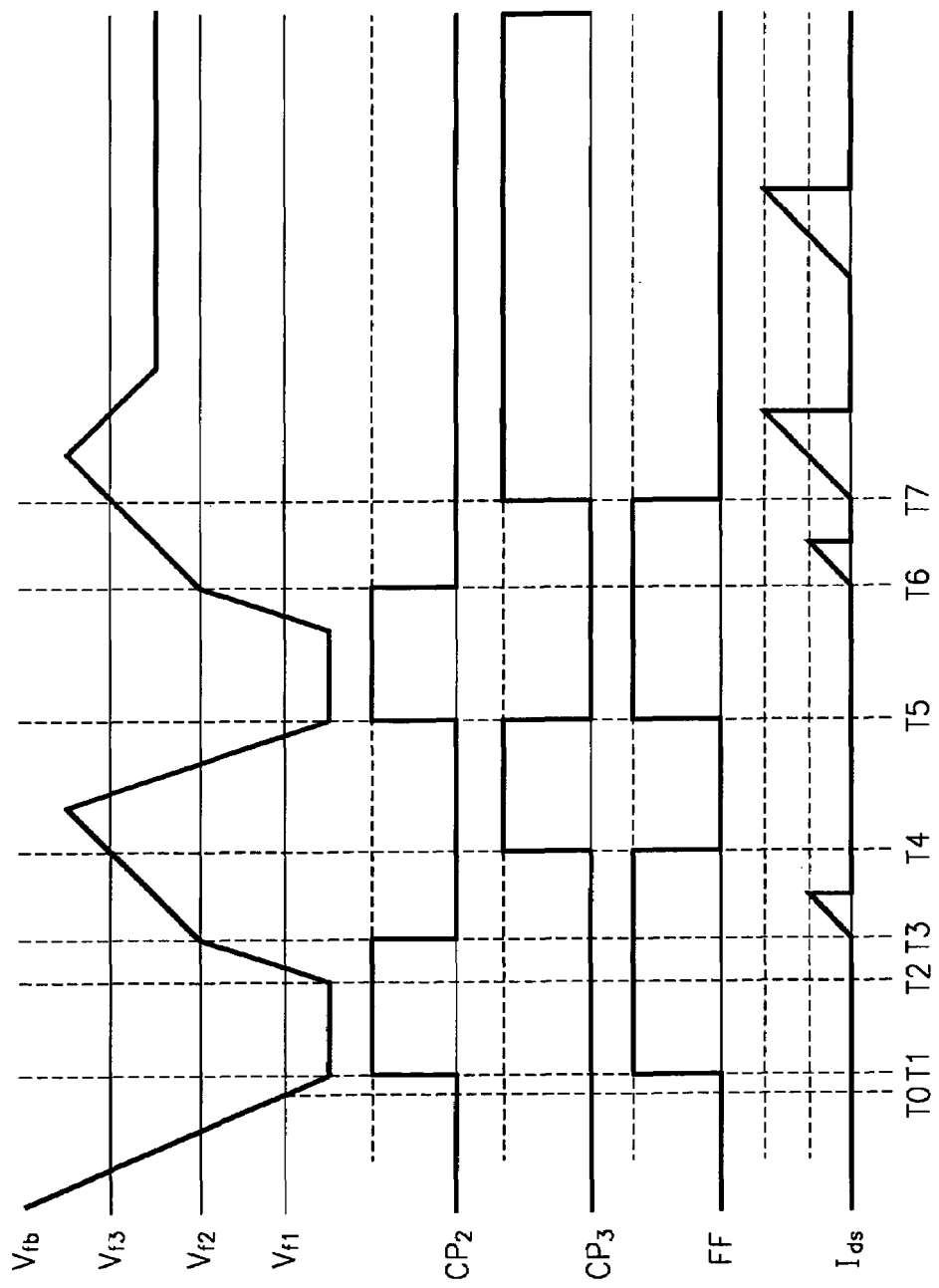
FIGS. 3 and 4 are timing diagrams showing waveforms of voltages of inputs and outputs of control module according to an embodiment of the present invention.
Figure 4:
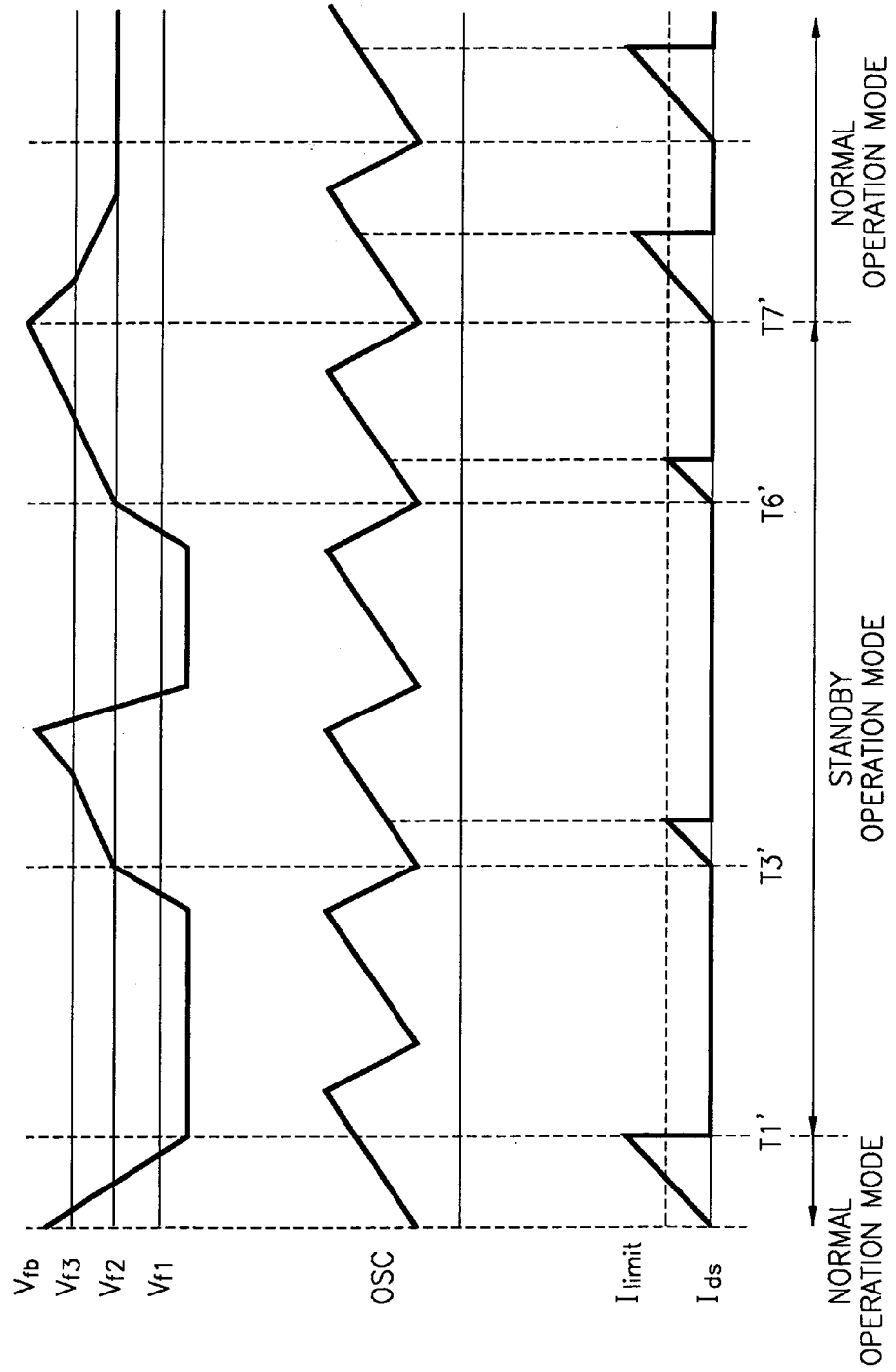

FIGS. 3 and 4 are timing diagrams showing waveforms of voltages of inputs and outputs of control module 310 according to an embodiment of the present invention.

Referring to FIGS. 2 and 3, when a light load is connected to or applied to the SPS 10, the feedback voltage $V_{fb}$ gradually decreases. If the standby operation mode starts through user's manipulation at time T0, the feedback voltage $V_{fb}$ input to the control module 310 begins to decrease and reaches near 0V (e.g., approximately 0.2V). More specifically, the feedback voltage $V_{fb}$ becomes lower than the third feedback reference voltage $Vf_3$, the second feedback reference voltage $Vf_2$ after a predetermined amount of time, and the first feedback reference voltage $V_{f1}$ after T0. At time T1 at which the feedback voltage $V_{fb}$ reaches near 0V, the second feedback voltage $Vf_2$ (at a high level) and the feedback voltage $V_{fb}$ (at a low level) are input to the non-inverting input (+) and the inverting input (−) of the operational amplifier of the comparator $CP_2$ 320, respectively. Thus, the output of the comparator $CP_2$ 320 is a high signal. The high signal output from the comparator $CP_2$ 320 is input to the S input of the RS flip-flop FF 324 and the base of the transistor $Q_2$ 326. The third feedback voltage $Vf_3$ (at a high level) and the feedback voltage $V_{fb}$ (at a low level) are input to the inverting input (−) and the non-inverting input (+) of the operational amplifier of the comparator $CP_3$ 322, respectively. Thus, the output of the comparator $CP_3$ 322 is a low signal. The low signal output from the comparator $CP_3$ 322 is input to the R input of the RS flip-flop FF 324.

The RS flip-flop FF 324, receiving the high and low signals respectively from the comparators $CP_2$ 320 and $CP_3$ 322, outputs a high signal through its Q output. this signal may be selectively applied to any one of the nodes between the $V_{fb}$ input and the collector of transistor $Q_2$ 326. The high signal output from the RS flip-flop FF 324 is maintained for a predetermined amount of time. The transistor $Q_2$ 326 receives the high signal through its base from the comparator $CP_2$ 320 and is turned on. The first switch $SW_1$ is switched (on) to connect the second current source $I_2$ 342 to the node between diode $D_5$ 334 and the collector of the transistor $Q_2$ 326, the second switch $SW_2$ is switched (off) to connect the output from the RS flip-flop FF 324 to the node between diode $D_4$ 332 and diode $D_5$ 334, and the third switch $SW_3$ is switched (on) to connect the first current source $I_1$ 344 to the input terminal of the feedback voltage $V_{fb}$. As a result, a voltage $V_b$ at the connection point between the cathode of the diode $D_5$ 334 and the collector of the transistor $Q_2$ 326 becomes 0V, and the current from the first current source $I_1$ 344 flows through the third switch $SW_3$ toward the input terminal of the feedback voltage $V_{fb}$.

Because the voltage $V_b$ is 0V, a low signal is input to the inverting input (−) of the operational amplifier of the comparator $CP_1$ 350, and the sense voltage $V_{sense}$ (at a high level) is input to the non-inverting input (+) of the operational amplifier of the comparator $CP_1$ 350. Thus, the output of the comparator $CP_1$ 350 is a high signal. The high signal is input to the gate driver 311, and the gate driver 311 outputs a switch-off signal by using an inverter (not shown) therein. The transistor $Q_{sw}$ 108 of FIG. 1 receives the switch-off signal output from the gate driver 311 through its gate node and is thus turned off.

The output voltage $V_{out}$ of SPS 10 in FIG. 1 begins to decrease from time T2 on due to the transistor $Q_{sw}$ 108 not performing the switch-on/off operations. As the output voltage $V_{out}$ gradually decreases, the feedback voltage $V_{fb}$ gradually increases. At time T3 at which the feedback voltage $V_{fb}$ begins to be greater than the second feedback reference voltage $V_{f2}$, the second feedback reference voltage $V_{f2}$ (at a low level) is input to the non-inverting input (+) of the operational amplifier of the comparator $CP_2$ 320, and the feedback voltage $V_{fb}$ (at a high level) is input to the inverting input (−) of the operational amplifier of the comparator $CP_2$ 320. As for the comparator $CP_3$ 322, by time T3, the feedback voltage $V_{fb}$ (at a low level) is input to the inverting input (−) of the operational amplifier of the comparator $CP_3$ 322, and the third feedback reference voltage $V_{f3}$ (at a high level) is input to the non-inverting input (+) of the operational amplifier of the comparator $CP_3$ 322. Thus, the output of the comparator $CP_3$ 322 is a low signal.

The RS flip-flop FF 324 receiving low signals respectively from the comparators $CP_2$ 320 and $CP_3$ 322 through its S and R inputs continues outputting a high signal through its Q output. The transistor $Q_2$ 326 receives the low signal at its base from the comparator $CP_2$ 320 and is turned off. As a result, a current from the second static current source $I_2$ flows the resistors $R_4$ 346 and $R_5$ 348 through the first switch $SW_1$. In other words, the voltage $V_b$ at the connection point between the cathode of the diode $D_5$ 334 and the collector of the transistor $Q_2$ 326 has a predetermined magnitude, and the voltage $V_c$ at the connection point between the resistors $R_4$ 346 and $R_5$ 348 has a predetermined magnitude, that is, $$\frac{R_5}{R_4 + R_5} \times V_b.$$

Since the voltage $V_b$ is at a higher level than the sense voltage $V_{sense}$, the comparator $CP_1$ 350 outputs a low signal to the gate driver 311. The gate driver 311 in turn generates a gate voltage signal used to perform the switch-on/off operations of the transistor $Q_{sw}$ 108 of FIG. 1. Between the drain and source of the transistor $Q_{sw}$ 108, referring again to FIG. 3, a current $I_{ds}$ having a triangle waveform flows during the on-state of the transistor $Q_{sw}$ 108. The maximum amplitude of current $I_{ds}$ is determined based on the magnitude of voltage $V_c$ at the connection point between the resistors $R_4$ 346 and $R_5$ 348. The voltage $V_c$ at the connection point between the resistors $R_4$ 346 and $R_5$ 348 can be maintained at a specific level by controlling the second static current source $I_2$, which allows the maximum amplitude of current $I_{ds}$ to be maintained below a predetermined level. The timings for switch-on/off operations are determined based on waveforms of signals of inputs to the gate driver 311 from the oscillator OSC 352.

At time $T_4$, when the feedback voltage $V_{fb}$ begins to be greater than the third feedback reference voltage $V_{f3}$, the output of the comparator $CP_3$ 322 changes from low to high, and thus the output of the RS flip-flop FF 324 changes from high to low. The transistor $Q_2$ 326 is turned off, and the first switch $SW_1$ also is turned off in response to the low signal output from the RS flip-flop FF 324. Thus, the voltage $V_c$ at the connection point between the resistors $R_4$ 346 and $R_5$ 348 reaches 0V. As a result, the output of the comparator $CP_1$ 350 is a high signal. The high signal is input to the gate driver 311, and the gate driver 311 outputs the switch-off signal by using the inverter (not shown) therein. The transistor $Q_{sw}$ 108 of FIG. 1 receives the switch-off signal output from the gate driver 311 at its gate node, is turned off, and does not perform the switch-on/off operations.

As the load on the entire system becomes light due to the transistor $Q_{sw}$ 108 not performing the switch-on/off operations, the feedback voltage $V_{fb}$ begins to decrease again. Thereafter, at time $T_5$ at which the feedback voltage $V_{fb}$ is lower than the first feedback reference voltage $V_{f1}$, the output of the comparator $CP_2$ 320 changes from low to high, and the output of the comparator $CP_3$ 322 changes from high to low. Thus, the transistor $Q_2$ 326 is turned on, and the RS flip-flop FF 324 generates a high signal. The operation of control module 310 after time $T_5$ is the same as that after time $T_1$ and as such, will not be repeated. Likewise, the operation of control module 310 after time $T_6$ at which the feedback voltage $V_{fb}$ begins to be greater than the second feedback reference voltage $V_{f2}$ is the same as that after time $T_3$ and as such, will not be repeated.

After completion of the standby operation mode, the feedback voltage $V_{fb}$ is greater than the third feedback reference voltage $V_{f3}$ at time $T_7$. At time $T_7$, the normal operation mode starts. Feedback voltage $V_{fb}$ decreases thereafter, and is maintained at a level greater than the second feedback reference voltage $V_{f2}$ and smaller than the third feedback reference voltage $V_{f3}$. The output of the comparator $CP_2$ 320 is maintained at a low level during the normal operation mode, and the output of the comparator $CP_3$ 322 is maintained at a high level. The output of the RS flip-flop FF 324 is maintained at a low level.

Referring to FIGS. 2 and 4, because the voltage $V_c$ at the connection point between the resistors $R_4$ 346 and $R_5$ 348 is 0V from time $T_1$ (at which the normal operation mode is changed to the standby operation mode) to time $T_2$ (at which the transistor $Q_{sw}$ 108 is turned on), the transistor $Q_{sw}$ 108 does not performs the switch-on/off operations even when the output from the oscillator OSC 352 is input to the gate driver 311. However, the transistor $Q_{sw}$ 108 performs the switch-on/off operations from time $T_3$, at which the voltage $V_c$ is maintained at a specific level with changes in the feedback voltage $V_{fb}$. Thereafter, the timings for switch-on/off operations are determined based on the output from the oscillator OSC 352. In other words, while the output signal from the oscillator OSC 352 increases, the transistor $Q_{sw}$ 108 is turned on, and the current $I_{ds}$ flowing between the drain and source of transistor $Q_{sw}$ 108 is generated. As described above, since the current $I_{ds}$ flowing between the drain and source of transistor $Q_{sw}$ 108 in the standby operation mode is maintained below a predetermined level at the connection point between the resistors $R_4$ 346 and $R_5$ 348, it does not exceed a maximum limit of current $I_{limit}$.

Once the feedback voltage $V_{fb}$ is greater than the third feedback reference voltage $V_{f3}$ after time $T_3$, the voltage $V_c$ at the connection point between the resistors $R_4$ 346 and $R_5$ 348 becomes 0V. Thus, the transistor $Q_{sw}$ 108 does not performs the switch-on/off operations even when the output from the oscillator OSC 352 is input to the gate driver 311. The operation after time $T_6$ is the same as that after time $T_3$, and thus will not be repeated.

The transistor $Q_{sw}$ 108 performs the switch-on/off operations from time $T_7$ (at which the standby operation mode is changed to the normal operation mode), and the duty cycle is determined based on a waveform of the voltage of the output from the oscillator OSC 352.

Figure 5:
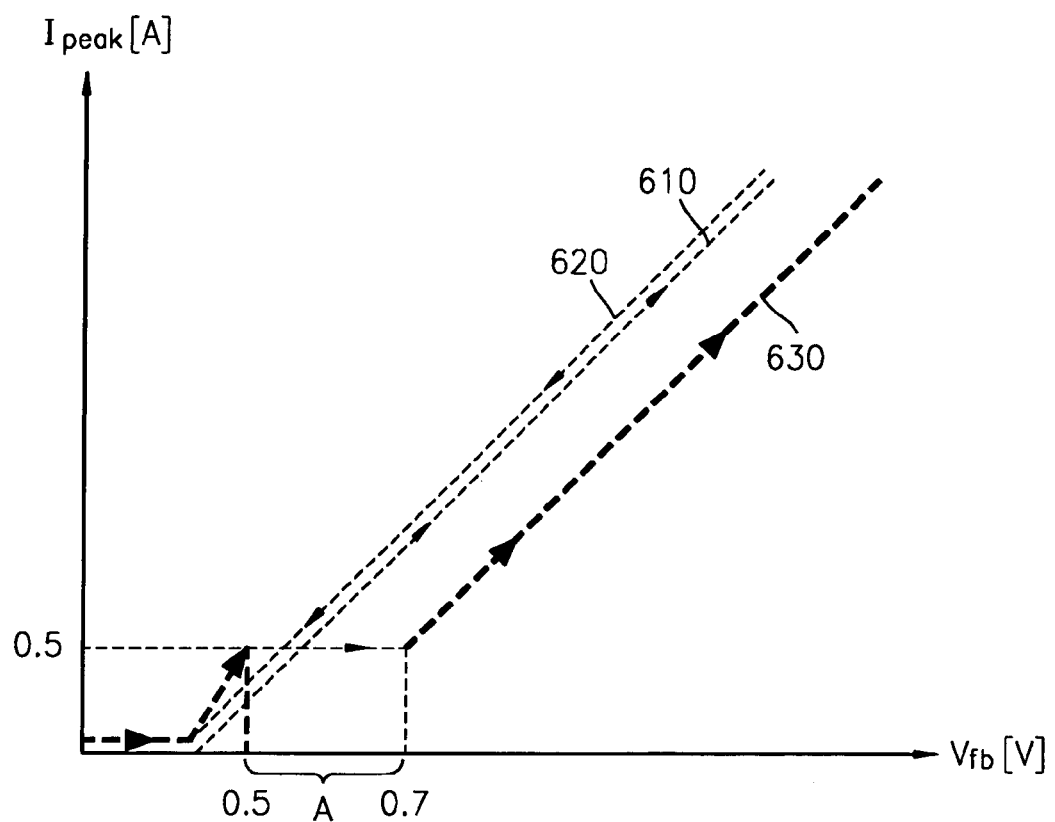
FIG. 5 is a graph showing a relationship between a feedback voltage and a maximum amplitude of current flowing between a drain and source of a transistor, in the implementation for a control module of FIG. 2.

FIG. 5 is a graph showing a relationship between the feedback voltage $V_{fb}$ and a maximum amplitude $I_{peak}$ of current $I_{ds}$ flowing between the drain and source of transistor $Q_{sw}$ 108 in the implementation for the control module 310 of FIG. 2.

Referring to FIG. 5, when the feedback voltage $V_{fb}$ begins to increase, the maximum amplitude $I_{peak}$ of current $I_{ds}$ linearly increases (see reference numeral 610). When the feedback $V_{fb}$ begins to decrease, the maximum amplitude $I_{peak}$ of current $I_d$ also linearly decreases (see reference numeral 620). However, when the feedback voltage $V_{fb}$ begins to increase again, particularly if the feedback voltage $V_{fb}$ increases within 0.5–0.7V, the maximum amplitude $I_{peak}$ of current $I_{ds}$ is maintained at a specific level, e.g., 0.5 A. If the feedback voltage $V_{fb}$ increases out of the scope of 0.5–0.7V, the maximum amplitude $I_{peak}$ of current $I_{ds}$ linearly increases again (see reference numeral 630).

Figure 6:
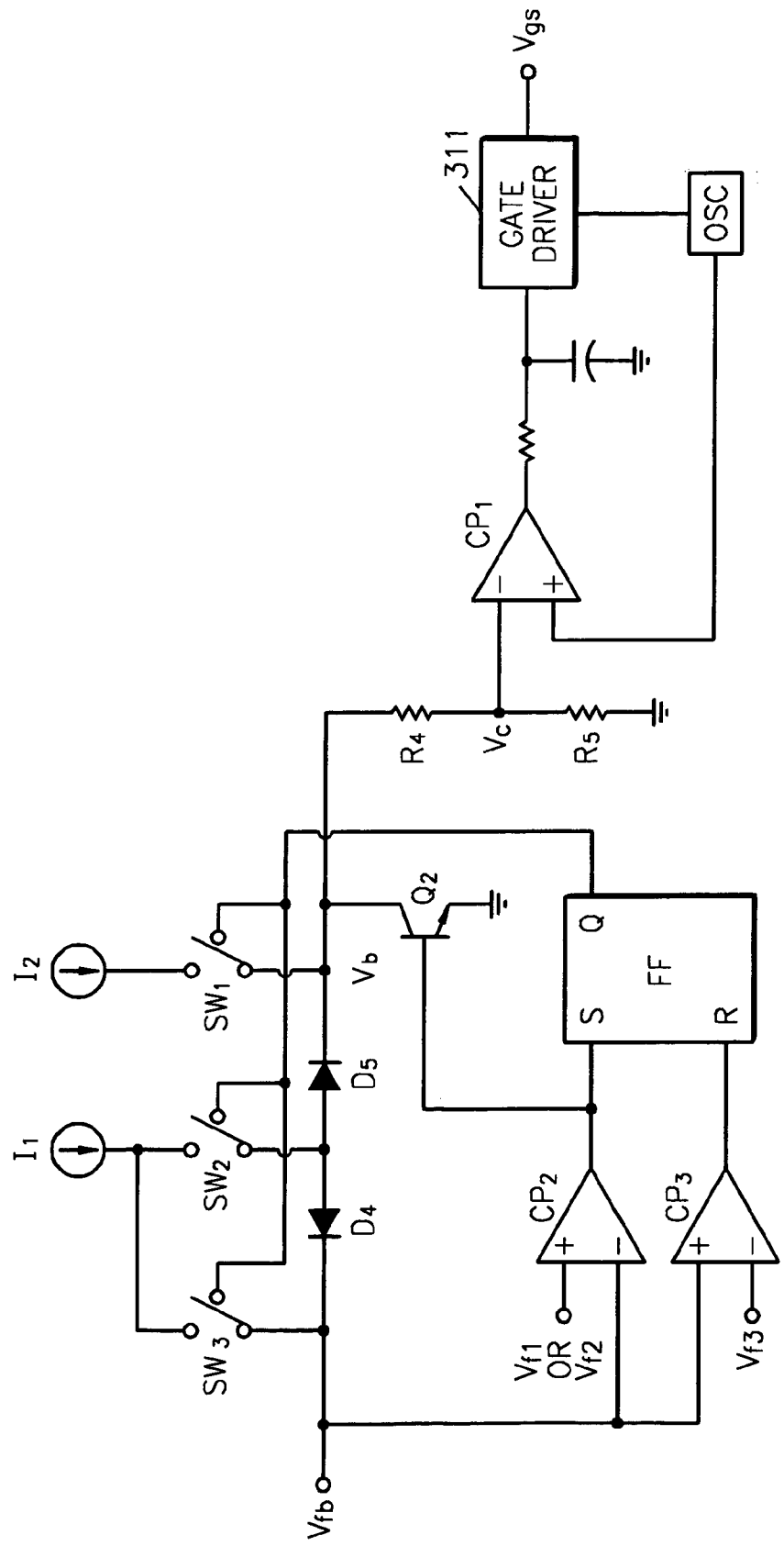
FIG. 6 is a circuit diagram of another implementation for a control module according to an embodiment of the present invention.

FIG. 6 is a circuit diagram of another implementation of a control module 310 according to an embodiment of the present invention. In FIG. 6, identical reference numerals to those of FIG. 2 represent identical elements to those of FIG. 2. Hereinafter, repetitive descriptions will be avoided, and descriptions with reference to FIG. 6 will focus on differences with FIG. 2 accordingly.

Referring to FIG. 6, in another implementation for the control module 310 according to an embodiment of the present invention, the voltage $V_c$ at the connection point between the resistors $R_4$ 346 and $R_5$ 348 is input to the inverting input (−) of the operational amplifier of the comparator $CP_1$ 350, but a signal indicating the waveform of the output signal from the oscillator OSC 352 is input to the non-inverting input (+) of the operational amplifier of the comparator $CP_1$ 350. In the implementation for control module 310 of FIG. 2, the non-inverting input (+) of the operational amplifier of the comparator $CP_1$ 350 receives the sense voltage $V_{sense}$ determined based on the current $I_{ds}$ flowing between the drain and source of transistor $Q_{sw}$ 108, and thus the control module 310 circuit of FIG. 2 operates in a current mode. By contrast, in the implementation for control module 310 of FIG. 6, the non-inverting of the comparator $CP_1$ 350 receives the signal indicating the waveform of the voltage of the output from the oscillator OSC 352, and thus the control module 310 circuit of FIG. 6 operates in a voltage mode. Because the control module 310 in the voltage mode does not need the sense voltage $V_{sense}$ of FIG. 1, it does not need the sense resistor $R_{sense}$ 110 of FIG. 1 either. The operations of the control module 310 according to this other embodiment of the present invention are the same as those of the control module 310 according to the first embodiment of the present invention and will not be described again.

Figure 7:
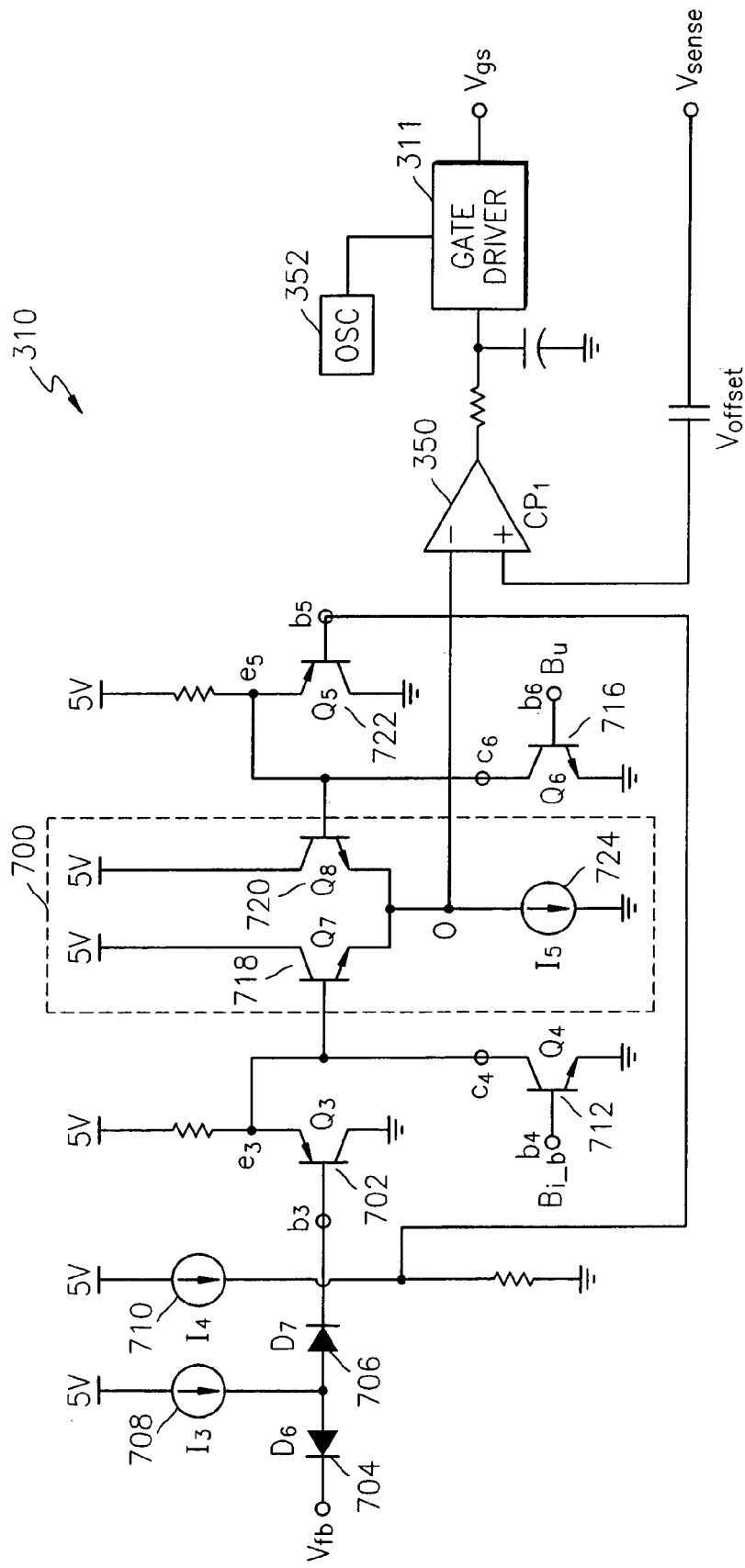
FIGS. 7 and 8 are circuit diagrams of yet another implementation for a control module according to an embodiment of the present invention.
Figure 8:
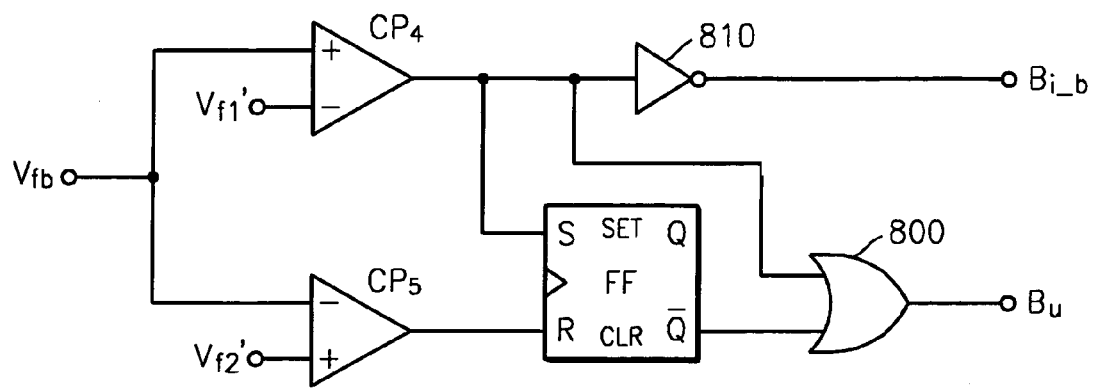

FIGS. 7 and 8 are circuit diagrams of yet another implementation for a control module 310 according to an embodiment of the present invention.

As depicted in FIG. 7, the input terminal of the feedback voltage $V_{fb}$ of the control module 310 of FIG. 1 is connected to a base $b_3$ of a transistor $Q_3$ 702 (which can be a PNP bipolar junction transistor) through diodes $D_6$ and $D_7$ that are sequentially disposed between the input terminal of the feedback voltage $V_{fb}$ and the base $b_3$ of the transistor $Q_3$ 702. An anode of the diode $D_6$ and a cathode of the diode $D_7$ face the input terminal of the feedback voltage $V_{fb}$ of the control module 310 of FIG. 1. On the other hand, a cathode of the diode $D_6$ and an anode of the diode $D_7$ face transistor $Q_3$ 702. Thus, the diode $D_6$ and the diode $D_7$ are arranged in opposite directions. A connection point between the diode $D_6$ and the diode $D_7$ is connected to a current source $I_3$.

An emitter $e_3$ of the transistor $Q_3$ 702 is connected to both a selector 700 and a collector $C_4$ of a transistor $Q_4$ 712 (which can be an NPN bipolar junction transistor). A burst current limit signal Bi_b is input to a base $b_4$ of the transistor $Q_4$ 712. An emitter of the transistor $Q_4$ 712 is grounded.

Meanwhile, a current source $I_4$, that is separate from the current source $I_3$, is connected to a base $b_5$ of a transistor $Q_5$ 722 (which can be a PNP bipolar junction transistor). An emitter $e_5$ of the transistor $Q_5$ 722 is connected to both the selector 700 and a collector $C_6$ of a transistor $Q_6$ 716 (which can be an NPN bipolar junction transistor). A normal operation signal Bu is input to a base $b_6$ of the transistor $Q_6$ 716. An emitter of the transistor $Q_6$ 716 is grounded.

The selector 700 may comprise two transistors $Q_7$ 718 and $Q_8$ 720 (which can be NPN bipolar junction transistors) and one current source $I_5$ 724. A base of the transistor $Q_7$ 718 is connected to the emitter $e_3$ of the transistor $Q_3$ 702 and the collector $c_4$ of the transistor $Q_4$ 712. A base of the transistor $Q_8$ 720 is connected to the emitter $e_5$ of the transistor $Q_5$ 722 and the collector $c_6$ of the transistor $Q_6$ 716. The emitter of the transistor $Q_7$ 718 and the emitter of the transistor $Q_8$ 720 are connected to each other and connected to an output O of the selector 700. The output O of the selector 700 is grounded through the static current source $I_5$ 724 inside the selector 700, but it is connected to a inverting input of the comparator $CP_1$ 350 outside the selector 700.

A non-inverting input of the comparator $CP_1$ 350 (having its inverting input connected to the output of the selector 700) is connected to receive the sense voltage $V_{sense}$ through the direct current source $V_{offset}$. This sense voltage $V_{sense}$ is, as shown in FIG. 1, indicative of the amount of current flowing through the transistor $Q_{sw}$ 108 and resistance of the current sense resistor $R_{sense}$ 110. The output of the comparator $CP_1$ 350 is input to the gate driver 311. The gate driver 311 receives the output of the oscillator OSC 352 in addition to the output of the comparator $CP_1$ 350 and outputs the gate voltage $V_g$. The transistor $Q_{sw}$ 108 is switched on/off by the gate voltage $V_g$. A duty cycle of the switch-on/off operations is determined based on a signal output from the oscillator OSC 352.

Below is a description of the operation of this implementation for the control module 310 according to an embodiment of the present invention.

A voltage at the base $b_3$ of the transistor $Q_3$ 702 is maintained at a specific level by the current source $I_3$. This voltage is level-shifted to the emitter $e_3$ of the transistor $Q_3$ 702. A voltage at the base $b_5$ of the transistor $Q_5$ 722 is maintained at a specific level (i.e., the feedback voltage $V_{fb}$) by the current source $I_4$. This voltage is also level-shifted to the emitter $e_5$ of the transistor $Q_5$ 722. The voltage at the base $b_3$ of the transistor $Q_3$ 702 and the voltage at the base $b_5$ of the transistor $Q_5$ 722 are selectively input to the selector 700. At least one of these voltages may be input or neither of them may be input. However, the two voltages are not simultaneously input.

Whether the voltage at the emitter $e_3$ of the transistor $Q_3$ 702 is input to the selector 700 is determined based on the burst current limit signal Bi_b. In particular, when the burst current limit signal Bi_b is high, the transistor $Q_4$ 712 is turned on. As a result, the voltage at the emitter $e_3$ of the transistor $Q_3$ 702 is not input to the selector 700. On the other hand, when the burst current limit signal Bi_b is low, the transistor $Q_4$ 712 is turned off. As a result, the voltage at the emitter $e_3$ of the transistor $Q_3$ 702 is input to the selector 700.

Whether the voltage at the emitter $e_5$ of the transistor $Q_5$ 722 is input to the selector 700 is determined based on the normal operation signal Bu. In particular, when the normal operation signal Bu is high, the transistor $Q_6$ 716 is turned on. As a result, the voltage at the emitter $e_5$ of the transistor $Q_5$ 722 is not input to the selector 700. On the other hand, when the normal operation signal Bu is low, the transistor $Q_6$ 716 is turned off. As a result, the voltage at the emitter $e_5$ of the transistor $Q_5$ 722 is input to the selector 700.

The voltage at the emitter $e_3$ of the transistor $Q_3$ 702 is input to the base of the transistor $Q_7$ 718 inside the selector 700. Similarly, the voltage at the emitter $e_5$ of the transistor $Q_5$ 722 is input to the base of the transistor $Q_8$ 720 inside the selector 700. Either the transistor $Q_7$ 718 or the transistor $Q_8$ 720 inside the selector 700 is turned on. In other words, either the voltage at the emitter $e_3$ of the transistor $Q_3$ 702 or the voltage at the emitter $e_5$ of the transistor $Q_5$ 722 is input to the selector 700. When the voltage at the emitter $e_3$ of the transistor $Q_3$ 702 is input to the selector 700, it is provided to the emitter of the transistor $Q_7$ 718 and is then output outside the selector 700 through the output O of the selector 700.

The output of the selector 700 is fed to the inverting input of the comparator $CP_1$ 350. The sense voltage $V_{sense}$ is input to the non-inverting input of the comparator $CP_1$ 350. The sense voltage $V_{sense}$ is, as shown in FIG. 1, determined based on the amplitudes of current flowing through the transistor $Q_{sw}$ 108 and a resistance of the current sense resistor $R_{sense}$ 110. The comparator $CP_1$ 350 compares the output of the selector 700 with the sense voltage $V_{sense}$ and outputs the result of the comparison to the gate driver 311. The gate driver 311 receives a signal of the oscillator OSC 352 that determines a duty cycle of the switch-on/off operations in addition to the output of the comparator $CP_1$ 350 and outputs the gate voltage $V_g$.

Referring to FIG. 8, comparators $CP_4$ 812 and $CP_5$ 814 are arranged in parallel. The comparator $CP_4$ 812 includes an operational amplifier that receives the feedback voltage $V_g$ through its non-inverting input (+) and receives a first feedback reference voltage $V_{f1}'$ that is smaller than the feedback voltage $V_{fb}$ through its inverting input (−). The comparator $CP_5$ includes an operational amplifier that receives the feedback voltage $V_g$ through its inverting input (−) and receives a second feedback reference voltage $V_{f2}'$ that is smaller than the feedback voltage $V_g$ through its non-inverting input (+).

The output of the comparator $CP_4$ 812 is inverted by an inverter 810 and is then used as the burst current limit signal Bi_b that is input to the base $b_4$ of the transistor $Q_4$ 712 in FIG. 7. The output of the comparator $CP_4$ 812 that outputs the burst current limit signal Bi_b and the output of the comparator $CP_5$ are input to the S input and the R input of the RS flip-flop FF, respectively. Also, the output of the comparator $CP_4$ 812 is also input to an input end of an OR gate 800 as well as to the S input of the RS flip-flop FF 816. The other input end of the OR gate 800 is connected to $\overline{Q}$ output of the RS flip-flop FF 816. The normal operation signal Bu is output from the output of the OR gate 800 and is input to the base $b_6$ of the transistor $Q_6$ 716. The logic state of each of circuit elements is determined based on the input feedback voltage $V_{fb}$. Output signals of circuit elements of FIGS. 7 and 8 with respect to the input feedback voltage $V_{fb}$ are shown in the following Table 1.

TABLE 1

|  | $CP_4$ | $CP_5$ | Bu | Bi_b | $\overline{Q}$ |
| --- | --- | --- | --- | --- | --- |
| Normal operation mode | H | L | H | L | L |
| $V_{f1}' \leq V_{fb} \leq V_{f2}'$ | L | L | L | H | L |
| $V_{fb} \leq V_{f2}'$ | L | H | H | H | H |
| $V_{f2}' \leq V_{fb} \leq V_{f1}'$ | L | L | H | H | H |

Hereinafter, the operation of this implementation for control module 310 according to an embodiment of the present invention will be described with reference to Table 1. First, in a normal operation mode where the feedback voltage $V_{fb}$ is greater than the first feedback reference voltage $V_{f1}'$, the output of the comparator $CP_4$ 812 is high (H) and the output of the comparator $CP_5$ is low (L). The output of the comparator $CP_4$ 812 is inverted into low (L) by the inverter 810 and is generated as a burst current limit signal Bi_b of low (L) value. The high signal (H) output from the comparator $CP_4$ 812 and the low signal (L) output from the comparator $CP_5$ are input to the S input and the R input of the RS flip-flop FF 816, respectively. A low signal (L) is output from the $\overline{Q}$ output of the RS flip-flop FF 816 that receives the high signal (H) and the low signal (L) from the comparators $CP_4$ 812 and $CP_5$ 814. The low signal (L) output from the $\overline{Q}$ output of the RS flip-flop FF 816 is input to one input end of the OR gate 800. The high signal (H) output from the comparator $CP_4$ 812 is input to the other input end of the OR gate 800. The OR gate 800 that receives the low signal (L) from the $\overline{Q}$ output of the RS flip-flop FF 816 and the high signal (H) from the comparator $CP_4$ 812 outputs a high signal (H) and a normal operation signal Bu of high (H).

Next, in a burst mode where the feedback voltage $V_{fb}$ gradually decreases and is then smaller than the first feedback reference voltage $V_{f1}'$ and greater than the second feedback reference voltage $V_{f2}'$, the comparators $CP_4$ 812 and $CP_5$ 814 output low signals (L). The output signal of the comparator $CP_4$ 812 is inverted into a high signal (H) by the inverter 810 and is generated as a burst current limit signal Bi_b of high (H) value. The low signals (L) output from the comparators $CP_4$ 812 and $CP_5$ 814 are input to the S input and the R input of the RS flip-flop FF 816, respectively. A low signal (L) is output from the $\overline{Q}$ output of the RS flip-flop FF 816 that receives the low signals (L) from the comparators $CP_4$ 812 and $CP_5$ 814. The low signal (L) output from the $\overline{Q}$ output of the RS flip-flop FF 816 is input to one end of the OR gate 800. The low signal (L) output from the comparator $CP_4$ 812 is input to the other end of the OR gate 800. The OR gate 800 that receives the low signals (L) from the $\overline{Q}$ output of the RS flip-flop FF 816 and the comparator $CP_4$ 812 outputs a low signal (L), and thus, generates a normal operation signal Bu of low (L).

Next, when the feedback voltage $V_{fb}$ is smaller than the second feedback reference voltage $V_{f2}'$, the comparator $CP_4$ 812 outputs a low signal (L) and the comparator $CP_5$ 814 outputs a high signal (H). The low signal (L) of the comparator $CP_4$ 812 is inverted into a high signal (H) and is generated as the burst current limit signal Bi_b of high (H) value. The low signal (L) output from the comparator $CP_4$ 812 and the high signal (H) output from the comparator $CP_5$ 814 are input to the S input and the R input of the RS flip-flop FF 816, respectively. A high signal (H) is output from the $\overline{Q}$ output of the RS flip-flop FF 816 that receives the low signal (L) from the comparator $CP_4$ 812 and the high signal (H) from the comparator $CP_5$ 814. The high signal (H) output from the $\overline{Q}$ output of the RS flip-flop FF 816 is input to on input end of the OR gate 800. The low signal (L) output from the comparator $CP_4$ 812 is input to the other input end of the gate 800. The OR gate 800 that receives the high signal (H) from the $\overline{Q}$ output of the RS flip-flop FF 816 and the low signal (L) from the comparator $CP_4$ 812 outputs a high signal (H) and generates the normal operation signal Bu of high (H).

Next, the feedback voltage $V_{fb}$ increases again and is then smaller than the first feedback reference voltage $V_{f1}'$ and greater than the second feedback reference voltage $V_{f2}'$, [Q: How can this be? If $V_{f2}$ and $V_{f1}$ are fixed, then $V_{f1}$ must always be less than $V_{f2}$.] the comparators $CP_4$ 812 and $CP_4$ 814 output low signals (L). The output signal (L) of the comparator $CP_4$ 816 is inverted into a high signal (H) by the inverter 810 and is generated as the burst current limit signal Bi_b of high (H) value. The low signals (L) output from the comparators $CP_4$ 812 and $CP_5$ 814 are input to the S input and the R input of the RS flip-flop FF 816, respectively. A high signal (H) is output from the $\overline{Q}$ output of the RS flip-flop FF 816 that receives the low signals (L) from the comparators $CP_4$ 812 and $CP_5$ 814. The high signal (H) output from the $\overline{Q}$ output of the RS flip-flop FF 816 is input to one input end of the OR gate 800. The low signal (L) output from the comparator $CP_4$ 812 is input to the other input end of the gate 800. The OR gate 800 that receives the high signal (H) from the $\overline{Q}$ output of the RS flip-flop FF 816 and the low signal (L) from the comparator $CP_4$ 812 outputs a high signal (H) and generates the normal operation signal Bu of high (H).

As described above, both the burst current limit signal Bi_b and the normal operation signal Bu may be high (H) at the same time, but both may not be low (L) at the same time. If both the burst current limit signal Bi_b and the normal operation signal Bu are high (H), then no signal is input to the selector 700 of FIG. 7. On the other hand, if both the burst current limit signal Bi_b and the normal operation signal Bu are low (L), then two signals would simultaneously be input to the selector 700 of FIG. 7. Thus, with some embodiments, it is possible for no signal to be input to the selector 700, but it is not possible for two signals to be simultaneously input to the selector 700.

Figure 9:
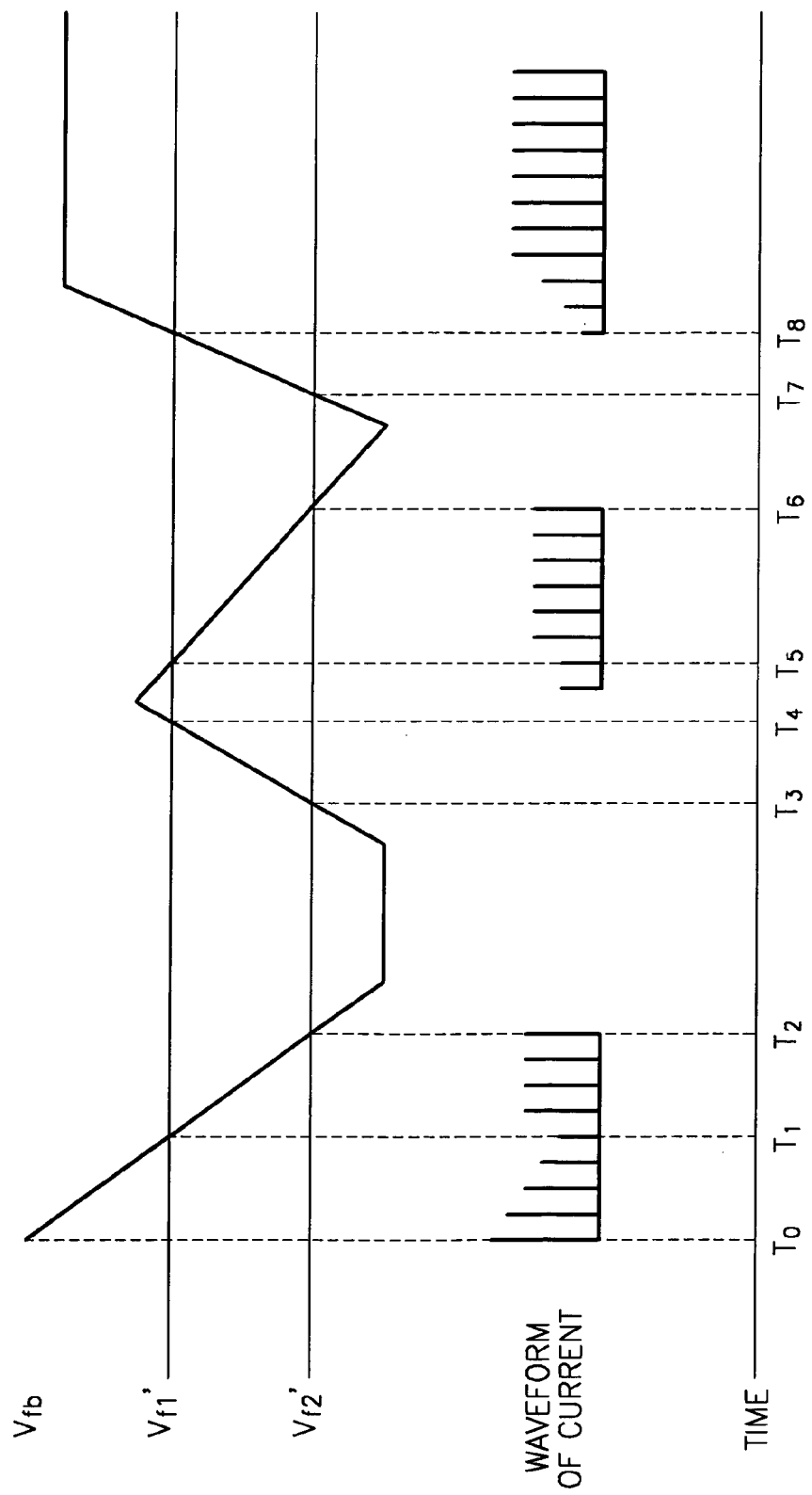
FIG. 9 is a timing diagram showing waveforms of signals for control module according to an embodiment of the present invention.

FIG. 9 is a timing diagram showing waveforms of signals for a control module 310 according to an embodiment of the present invention.

Referring to FIGS. 7, 8, and 9, when a load on the entire system becomes light, the feedback voltage $V_{fb}$ begins to decrease. When the feedback voltage $V_{fb}$ becomes smaller than the first feedback reference voltage $V_{f1}'$, this implementation for the control module 310 according to an embodiment of the present invention operates in the burst current limit mode. This is because the burst mode and the normal operation mode are distinguished based on the first feedback reference voltage $V_{f1}'$. In other words, when the feedback voltage $V_{fb}$ is greater than the first feedback reference voltage $V_{f1}'$, this implementation of the control module 310 operates in the normal operation mode. On the other hand, when the feedback voltage $V_{fb}$ is smaller than the first feedback reference voltage $V_{f1}'$, this implementation of the control module 310 operates in the burst mode in which the amplitude of a current is limited. After a period of time has passed, the feedback voltage $V_{fb}$ is smaller than the second feedback reference voltage $V_{f2}'$. In this case, the control module 310 does not perform the switch-on/off operations. This is because the second feedback reference voltage $V_{f2}'$ is used as a reference voltage to determine whether the switch-on/off operations are performed. In other words, when the feedback voltage $V_{fb}$ is greater than the second feedback reference voltage $V_{f2}'$, the switch-on/off operations are performed. However, when the feedback voltage $V_{fb}$ is smaller than the second feedback reference voltage $V_{f2}'$, the switch-on/off operations are not performed.

More specifically, from time $T_0$ to time $T_1$, the control module 310 operates in the normal operation mode. In this case, the high signal (H) and the low signal (L) are input to the non-inverting input of the comparator $CP_4$ 812 and the inverting input of the comparator $CP_5$ 814, respectively. Thus, the burst current limit signal Bi_b of low (L) and the normal operation signal Bu of high (H) are generated by the operation of the control module 310 of FIG. 8. As a result, in FIG. 7, the voltage at the emitter $e_3$ of the transistor $Q_3$ 702 is input to the selector 700, is then output from the selector 700 to the inverting input of the comparator $CP_1$ 350, and is generated by the gate driver 311 as a gate control signal (the gate voltage $V_g$) used to perform the switch-on/off operations in the normal operation mode. Since the voltage at the emitter $e_3$ of the transistor $Q_3$ 702 is proportional to the feedback voltage $V_{fb}$, an output current changes in proportion to the feedback voltage $V_{fb}$. Thus, from time $T_0$ to time $T_1$, the feedback voltage $V_{fb}$ gradually decreases, and thus, the amplitude of a current also gradually decreases.

From time $T_1$ to time $T_2$, the control module 310 operates in the burst current limit mode. During this period, the low signals (L) are input to the non-inverting input of the comparator $CP_4$ 812 and the inverting input of the comparator $CP_5$ 814, respectively. Thus, the burst current limit signal Bi_b of high (H) and the normal operation signal Bu of low (L) are generated by the operation of the control module 310 of FIG. 8. As a result, in FIG. 7, the voltage at the emitter $e_5$ of the transistor $Q_5$ 722 is input to the selector 700, is then output from the selector 700 to the inverting input of the comparator $CP_1$ 350, and is generated by the gate driver 311 as the gate control signal (the gate voltage $V_g$) used to perform the switch-on/off operations in the burst current limit mode. Since the voltage at the emitter $e_5$ of the transistor $Q_5$ 722 is proportional to a voltage of a specific amplitude that is introduced by the current source $I_4$, an output current changes in proportion to the voltage of the specific amplitude. As a result, the output current is maintained at a specific level in proportion to the voltage of the specific amplitude. Thus, during the period from time $T_1$ to time $T_2$, although the feedback voltage $V_{fb}$ gradually decreases, the amplitude of the output current is limited below a predetermined level and is then maintained at a specific level.

From time $T_2$ to time $T_3$, the control module 310 does not perform the switch-on/off operations. During this period, the low signal (L) and the high signal (H) are input to the non-inverting input of the comparator $CP_4$ 812 and the inverting input of the comparator $CP_5$ 814, respectively. Thus, the burst current limit signal Bi_b of high (H) and the normal operation signal Bu of low (L) are generated by the operation of the control module 310 of FIG. 8. Thus, in FIG. 7, both the voltage at the emitter $e_3$ of the transistor $Q_3$ 702 and the voltage at the emitter $e_5$ of the transistor $Q_5$ 722 are not input to the selector 700. As a result, the gate control signal (the gate voltage $V_g$) is not generated by the gate driver 311.

From time $T_3$ to time $T_4$, the control module 310 still does not perform the switch-on/off operations. During this period, the low signals (L) are input to the non-inverting input of the comparator $CP_4$ 812 and the inverting input of the comparator $CP_5$ 814. However, the burst current limit signal Bi_b of high (H) and the normal operation signal Bu of high (H) are generated by the operation of the control module 310 of FIG. 8. In contrast to the period from time $T_1$ to time $T_2$, the normal operation signal Bu of high (H) is generated because of the RS flip-flop FF 816. In FIG. 7, neither the voltage at the emitter $e_3$ of the transistor $Q_3$ 702 nor the voltage at the emitter $e_5$ of the transistor $Q_5$ 722 is input to the selector 700. As a result, the gate control signal (the gate voltage $V_g$) is not generated by the gate driver 311.

From time $T_4$ to time $T_5$, if the presence of an external load is not sensed, or rather if a decrease in the external load is sensed, the feedback voltage $V_{fb}$ begins to decrease again. The operation of the control module 310 from time $T_5$ to time $T_6$ (during which the feedback voltage $V_{fb}$ decreases and is smaller than the first feedback reference voltage $V_{f1}'$), from time $T_6$ to time $T_7$ (during which the feedback voltage $V_{fb}$ is smaller than the second feedback reference voltage $V_{f2}'$), and from time $T_7$ to time $T_8$ (during which the feedback voltage $V_{fb}$ increases again and is greater than the second feedback reference voltage $V_{f2}'$) are identical to the operation of the control module 310 from time $T_1$ to time $T_2$, from time $T_2$ to time $T_3$, and from time $T_3$ to time $T_4$, respectively. At time $T_8$ where the feedback voltage $V_{fb}$ is greater than the first feedback reference voltage $V_{f1}'$, the control module 310 operates in the normal operation mode as long as the decrease in the external load is not sensed.

The operation of one implementation of the control module 310 (for example, as shown in and described with reference to FIG. 2) is determined based on the results of the comparison of three feedback reference voltages $V_{f1}$, $V_{f2}$, and $V_{f3}$ with the feedback voltage $V_{fb}$. On the other hand, the operation of another implementation of the control module 310 (for example, as shown in and described with reference to FIGS. 7 and 8) is determined based on the result of the comparison of two feedback reference voltages $V_{f1}'$ and $V_{f2}'$ with the feedback voltage $V_{fb}$. Accordingly, it is possible to reduce power consumption necessary for converting from the burst mode into the normal operation mode and to design an internal circuit more simply.

As described herein, the control module 310 according to the present invention delimits a maximum amplitude of current below a predetermined level by using an automatic burst operation mode and a current operation mode, thereby preventing occurrence of audible noises and providing low power consumption. In particular, when using two sense levels—e.g., the first feedback reference voltage and the second feedback reference voltage—it is possible to design the internal circuit more simply and reduce power consumption required for conversion from the burst mode into the normal operation mode, thereby preventing malfunction of the control module 310.

While the present invention has been particularly shown and described with reference to exemplary embodiments thereof, it will be understood by those of ordinary skill in the art that various changes in form and details may be therein without departing from the spirit and scope of the invention as defined by the appended claims and their equivalents.

What is claimed is:

1. A control module of a switching power supply (SPS) having normal and standby operation modes, the control module for controlling switch-on/off operations of a switching device of the SPS using a feedback voltage that is inversely proportional to an output voltage, the control module comprising:

a voltage set-up unit operable to provide a first voltage used for a switch-on operation of the switching device in response to changes in the feedback voltage and a second voltage used for a switch-off operation of the switching device in response to changes in the feedback voltage, in the standby operation mode; and a switching control unit coupled to the voltage set-up unit and operable to generate a control signal, wherein the control signal is used to turn on the switching device when the first voltage is provided from the voltage set-up unit and wherein the control signal is used to turn off the switching device when the second voltage is provided from the voltage set-up unit.

2. The control module of claim 1, wherein the voltage set-up unit comprises:

a first current source;

a second current source;

a first comparator operable to compare the feedback voltage with a first or second feedback reference voltage and to generate an output signal based on a result of the comparison;

a second comparator operable to compare the feedback voltage with a third feedback reference voltage greater than the first or second feedback reference voltage and to generate an output signal based on a result of the comparison;

a transistor operable to be turned on or off in response to the output signal of the first comparator;

an RS flip-flop operable to receive the output signals of the first and second comparators at its S and R inputs, respectively, and to generate an output signal at its Q output; and a first switch operable to selectively connect a collector of the transistor with the Q output of the RS flip-flop or the second current source, thereby allowing the voltage set-up unit to generate the first voltage by controlling an amount of current supplied by the second current source even when the feedback voltage increases.

3. The control module of claim 2 further comprising first and second resistors connected at either side of a point at which the first voltage or the second voltage is applied according to an on or off state of the transistor or the switch-on and/or off operations of the first switch.

4. The control module of claim 2, wherein one end of the first resistor is connected to the collector of the transistor and another end of the first resistor is connected to the point at which the first voltage or the second voltage is applied, and one end of the second resistor is connected to the point at which the first voltage or the second voltage is applied and another end of the second resistor is connected to ground.

5. The control module of claim 4 further comprising a first diode and a second diode, wherein the first diode has a cathode connected to a terminal at which the feedback voltage is applied, and wherein the second diode has an anode connected to an anode of the first diode and a cathode connected to the collector of the transistor.

6. The control module of claim 5 further comprising:
a second switch operable to selectively connect a connection point between the first and second diodes to either the first current source or the Q output of the RS flip-flop; and
a third switch operable to selectively connect a connection point between the terminal to which the feedback voltage is applied and the first diode to either the first current source or the Q output of the RS flip-flop.

7. The control module of claim 1, wherein the switching control unit comprises:
a third comparator operable to receive the first or second voltage from the voltage set-up unit at its inverting input and a sense voltage corresponding to a current flowing through the switching device at its non-inverting input and to generate an input signal based on a result of the comparison;
a gate driver operable to generate the control signal used to turn on or off the switching device in response to the output signal of the third comparator; and
an oscillator operable to provide a control signal used to determine a duty cycle of the switching device to the gate driver.

8. A control module of a switching power supply (SPS) having normal and standby operation modes, the control module for controlling switch-on/off operations of a switching device using a feedback voltage that is inversely proportional to an output voltage, the control module comprising:
a first voltage supply means operable to supply a first voltage that is proportional to the feedback voltage, in response to a first control signal;
a second voltage supply means operable to supply a second voltage of a predetermined magnitude, in response to a second control signal;
a control signal generating means operable to generate the first control signal or the second control signal according to an amount of the feedback voltage;
a selector operable to receive and to output the first voltage or the second voltage; and
a switching control signal generating means operable to generate a switching control signal for the switching device in response to an output signal from the selector.

9. The control module of claim 8, wherein the first voltage supply means comprises:
a first current source;
a first diode having an anode connected to the first current source and a cathode connected to an input terminal for the feedback voltage;
a second diode having an anode connected to the first current source;
a first transistor connected at its base to a cathode of the second diode and connected at its emitter to the selector; and
a second transistor connected at its base to receive the first control signal, connected at its collector to the emitter of the first transistor, and connected at its emitter to ground.

10. The control module of claim 8, wherein the second voltage supply means comprises:
a second current source;
a third transistor having a base connected to the second current source and an emitter connected to the selector; and
a fourth transistor having a base that receives the second control signal, a collector connected to the emitter of the third transistor, and an emitter connected to ground.

11. The control module of claim 8, wherein when the feedback voltage is smaller than a first feedback reference voltage, the control signal generating means operable to generate the first control signal and the second control signal so that a burst current limit mode operation can be performed, and wherein when the feedback voltage is smaller than a second feedback reference voltage, the control signal generating means generates the first control signal and the second control signal so that the switch-on/off operations of the switching device cannot be performed.

12. The control module of claim 11, wherein the control signal generating means comprises:
a first comparator operable to receive the feedback voltage through its non-inverting input and the first feedback reference voltage through its inverting input;
a second comparator operable to receive the feedback voltage through its inverting input and the second feedback reference voltage through its non-inverting input;
an inverter, which inverts an output of the first comparator and supplies the result of the inversion as the first control signal;
an RS flip-flop operable to receive an output of the first comparator at an S input and an output of the second comparator at an R input; and
an OR gate operable to receive the output of the first comparator and an output of the RS flip-flop, to perform an OR operation on the output of the first comparator and the output of the RS flip-flop, and to supply the result of the OR operation as the second control signal.

13. The control module of claim 8, wherein the selector comprises a fifth transistor having a base to which the first voltage is applied and a sixth transistor having a base to which the second voltage is applied, wherein an emitter of the fifth transistor and an emitter of the sixth transistor are connected and used as an output of the control signal generating means.

14. The control module of claim 8, wherein the control signal generating means comprises:
a third comparator operable to receive the output signal of the selector at its inverting input and a sense voltage corresponding to a current flowing through the switching device at its non-inverting input;
a gate driver operable to generate on/off control signals for the switching device according to an output of the third comparator; and
an oscillator operable to supply a control signal for determining a switching duty of the switching device to the gate driver.

* * * * *